United States Patent
Kuo et al.

(10) Patent No.: US 9,528,582 B2
(45) Date of Patent: Dec. 27, 2016

(54) INTERNAL-CIRCULATION-TYPE BALL SCREW

(71) Applicant: HIWIN TECHNOLOGIES CORP., Taichung (TW)

(72) Inventors: Chang-Hsin Kuo, Taichung (TW); Sheng-Chih Chang, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 0 days.

(21) Appl. No.: 14/742,029

(22) Filed: Jun. 17, 2015

(65) Prior Publication Data

US 2015/0369349 A1    Dec. 24, 2015

(30) Foreign Application Priority Data

Jun. 20, 2014   (TW) .............................. 103121399 A

(51) Int. Cl.
*F16H 25/22*    (2006.01)

(52) U.S. Cl.
CPC ...... *F16H 25/2228* (2013.01); *F16H 25/2233* (2013.01); *Y10T 74/19763* (2015.01)

(58) Field of Classification Search
CPC .............. F16H 25/2204; F16H 25/2214; F16H 25/2219; F16H 25/2223; F16H 25/2228; F16H 25/2233; Y10T 74/19749; Y10T 74/19763; Y10T 74/19767; Y10T 74/19772; Y10T 74/19777

(Continued)

(56) References Cited

U.S. PATENT DOCUMENTS 2,664,760 A  *  1/1954  Booth ...................... B62D 3/08
                                                      74/458
3,302,477 A  *  2/1967  Grabowski ......... F16H 25/2228
                                                    74/424.85

(Continued)

FOREIGN PATENT DOCUMENTS

DE        19857581 A1 *  6/2000   ......... F16H 25/2228
GB         1049179 A  * 11/1966   ......... F16H 25/2228

(Continued)

OTHER PUBLICATIONS

Hartmann Juergen, DE 19857581 A1, Jun. 2000, Machine translation via Espacenet, printed Mar. 29, 2016, p. 1-4.*

*Primary Examiner* — William C Joyce
*Assistant Examiner* — Leonard J Archuleta
(74) *Attorney, Agent, or Firm* — Muncy, Geissler, Olds & Lowe, P.C.

(57) ABSTRACT

An internal-circulation-type ball screw includes a nut, a screw shaft, and two returning members. The nut has an internal-thread groove. The screw shaft passes through the nut and has an external-thread groove. The internally and external-thread grooves are aligned to form a helix channel. The screw shaft has a returning channel and two opposite receiving recesses. Each of the receiving recesses is radially communicated between the external-thread groove and the returning channel. The returning members are received in the receiving recesses of the screw shaft and each have a redirecting channel. The redirecting channel is connected between the helix channel and the returning channel, so that balls are allowed to circulate along the helix channel, the redirecting channel and the returning channel. Thereby, the internal-circulation-type ball screw provides good durability, reliability and smoothness in use.

6 Claims, 6 Drawing Sheets

(58) Field of Classification Search
USPC .......................... 74/424.81, 424.82, 424.85, 424.86, 74/424.87
See application file for complete search history.

(56) References Cited

U.S. PATENT DOCUMENTS

| | | | | |
|---|---|---|---|---|
| 3,333,484 | A * | 8/1967 | Young | F16H 25/2228 74/424.85 |
| 3,377,879 | A * | 4/1968 | Shiwaku | F16H 1/163 74/425 |
| 3,581,592 | A * | 6/1971 | Roehrs | F16H 25/2204 74/424.6 |
| 4,006,646 | A * | 2/1977 | F'Geppert | F16H 1/163 74/425 |
| 4,258,584 | A * | 3/1981 | Haegele | F16H 25/2228 74/424.85 |
| 5,373,753 | A * | 12/1994 | Toyomasa | F16H 1/163 74/396 |
| 6,978,693 | B2 * | 12/2005 | Ohkubo | F16H 25/2214 74/424.75 |
| 2003/0051569 | A1 * | 3/2003 | Kapaan | F16D 65/18 74/424.85 |

FOREIGN PATENT DOCUMENTS

| | | | |
|---|---|---|---|
| JP | 2005-201347 A | 7/2005 | |
| JP | 2010-90953 A | 4/2010 | |
| TW | M472136 U | 2/2014 | |
| WO | WO 2015081191 A1 * | 6/2015 | ................ B60T 7/10 |

\* cited by examiner

INTERNAL-CIRCULATION-TYPE BALL SCREW

BACKGROUND OF THE INVENTION

1. Technical Field

The present invention relates to ball screws, and more particularly to an internal-circulation-type ball screw that provides good durability and cyclical stability.

2. Description of Related Art

In the art of ball screws, there are many approaches to internal circulation of balls. For example, Japan Patent No. 2010-090953 involves forming a circulation groove at the surface of the screw along which balls can circulate. However, since the circulation groove only strides across a single pitch, when the lead is low and close to the ball's diameter, it tends to impact the balls and get damaged because the thread's crest is thin. On the other hand, Taiwan Patent No. M472136 also uses a circulation groove that strides across a single pitch. In addition to the same problem as mentioned previously, an interrupted-thread designed when used can adds challenges to special configuration. Japan Patent No. 2005-201347 differently uses a segment difference generated at the surface of the screw to guide the balls. Nevertheless, the technology generally suffers from difficult processing and poor cyclical stability.

BRIEF SUMMARY OF THE INVENTION

The primary objective of the present invention is to provide an internal-circulation-type ball screw, which provides good durability, reliability and cyclical stability.

For achieving the foregoing objective, the disclosed internal-circulation-type ball screw comprises a nut, a screw shaft, two returning members, and a plurality of balls. The nut has an internal-thread groove. The screw shaft rotatably passes through the nut. The screw shaft has a returning channel. The returning channel extends axially along the screw shaft. The screw shaft has its outer surface provided with an external-thread groove and two opposite receiving recess. The external-thread groove corresponds to the internal-thread groove of the nut and work with the internal-thread groove of the nut to form a helix channel Each of the receiving recesses is radially communicated between the external-thread groove and the returning channel. Each of the returning members is received in one said receiving recess of the screw shaft and has a redirecting channel. The redirecting channel has one end connected to the helix channel. The redirecting channel has an opposite end connected to the returning channel of the screw shaft. The balls are rollably received in the helix channel, the redirecting channel, and the returning channel.

Thereby, the disclosed internal-circulation-type ball screw uses the closed path formed by the helix channel, the redirecting channel, and the returning channel to return the balls. This eliminates the need of using the interrupted-thread design and thereby helps to minimize the outer diameter of the nut and to prevent impact when the balls are returning, so as to ensure good durability, reliability and cyclical stability.

DETAILED DESCRIPTION OF THE INVENTION

Figure 1:
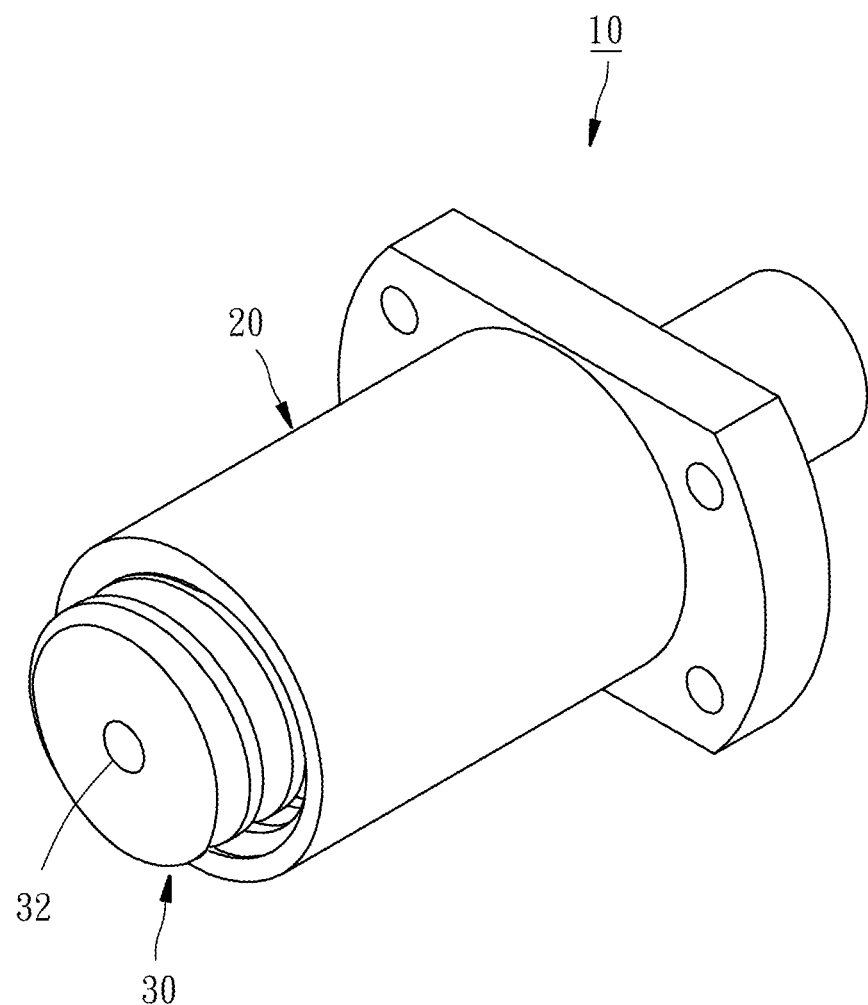
FIG. 1 is a perspective view of a first embodiment of the present invention.

In a general ball screw, balls move along the circulation path disposed on the nut. Since the circulation path is formed on the screw shaft, the screw shaft is inside of the nut, it is called internal-circulation-type ball screw.

Referring to FIGS. 1, 2, and 4 through 8, according to a first embodiment of the present invention, an internal-circulation-type ball screw 10 comprises a nut 20, a screw shaft 30, two returning members 40, and a plurality of balls 50.

Figure 2:
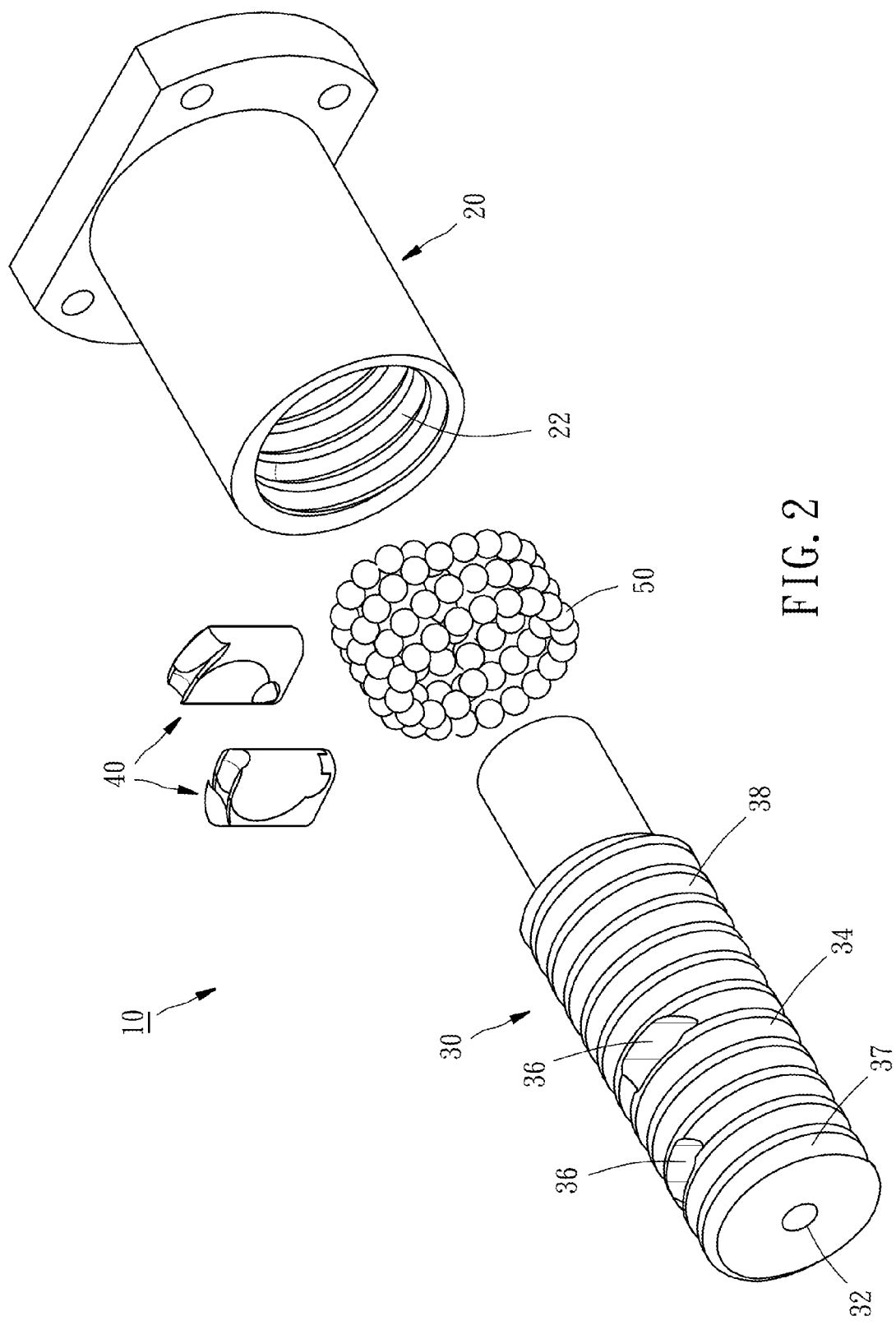
FIG. 2 is an exploded view of the first embodiment of the present invention.
Figure 3:
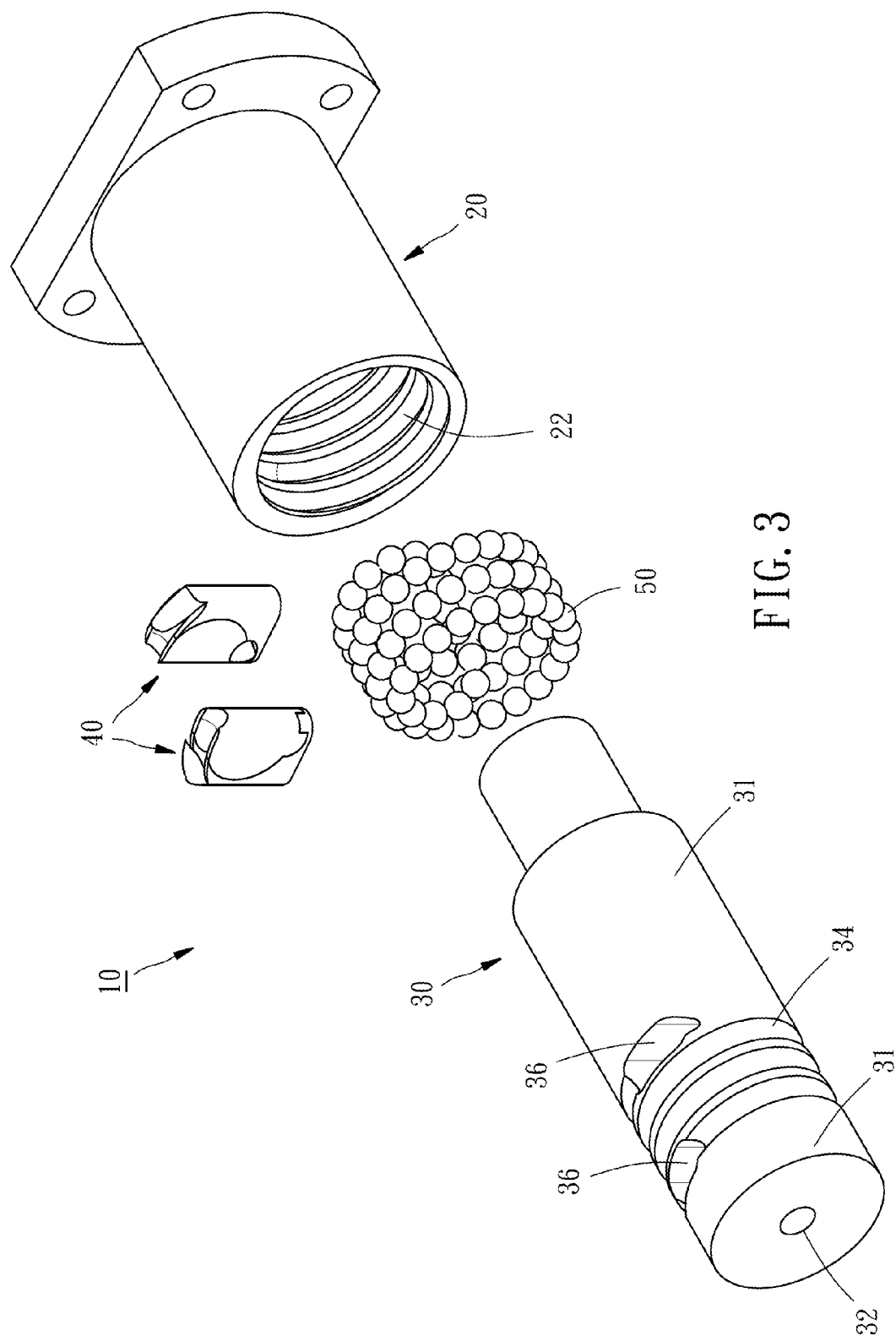
FIG. 3 is an exploded view of a second embodiment of the present invention.
Figure 4:
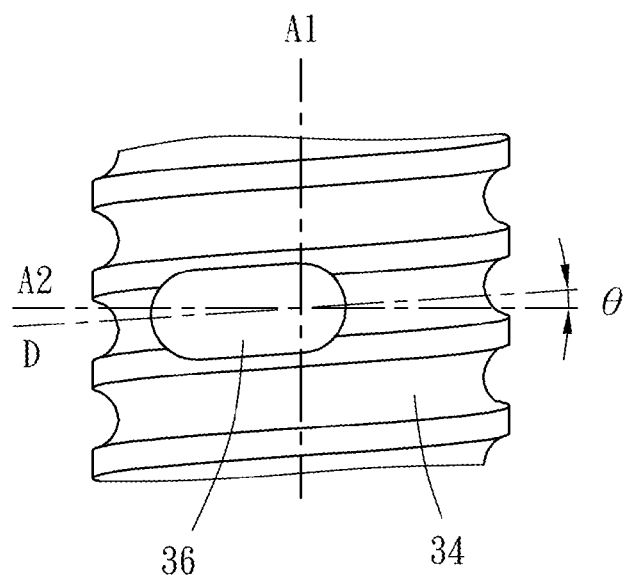
FIG. 4 is a partial, top view of the screw shaft in the first embodiment of the present invention.

The nut 20 has an internal-thread groove 22. The screw shaft 30 passes through the nut 20 and has axially a returning channel 32. In addition, the screw shaft 30 has its outer surface provided with an external-thread groove 34 and two opposite receiving recesses 36. The external-thread groove 34 corresponds to the internal-thread groove 22 of the nut 20, so as to form a helix channel 12 between itself and the internal-thread groove 22 of the nut 20. The receiving recesses 36 extend from two ends of the external-thread groove 34 along a radial direction of the screw shaft 30 to become communicated with the returning channel 32. Therein, for the sake of convenient manufacturing, the returning channel 32 has its one end extending and penetrating one end of the screw shaft 30, while the opposite end of the returning channel 32 usually does not penetrate the opposite end of the screw shaft 30. Moreover, on the outer surface of the screw shaft 30, in addition to the aforementioned external-thread groove 34, there may be a redundant threaded groove 37 and a redundant threaded groove 38 at two sides of the external-thread groove 34 for the sake of convenient manufacturing. As shown in FIG. 2, the extension lines of the redundant threaded groove 37, the redundant threaded groove 38, and the external-thread groove 34 are generally coincidental. The additional provision of the redundant threaded groove 37 and the redundant threaded groove 38 is merely for convenient manufacturing. If it is not the case that the outer surface of the screw shaft 30 has the redundant threaded groove 37 and redundant threaded groove 38, as an alternative, as shown in the second embodiment of the present invention depicted in FIG. 3, at each end of the screw shaft 30, an outer columnar surface 31 is formed at the outer surface. Furthermore, as shown in FIG. 4, the screw shaft 30 defines a central axis A1 and a datum plane A2 perpendicular to the central axis A1. Each of the receiving recesses 36 has an extending direction D that includes an included angle θ with the datum plane A2 of the screw shaft 30. The included angle θ is equal to a helix angle of the external-thread groove 34 of the screw shaft 30.

Figure 5:
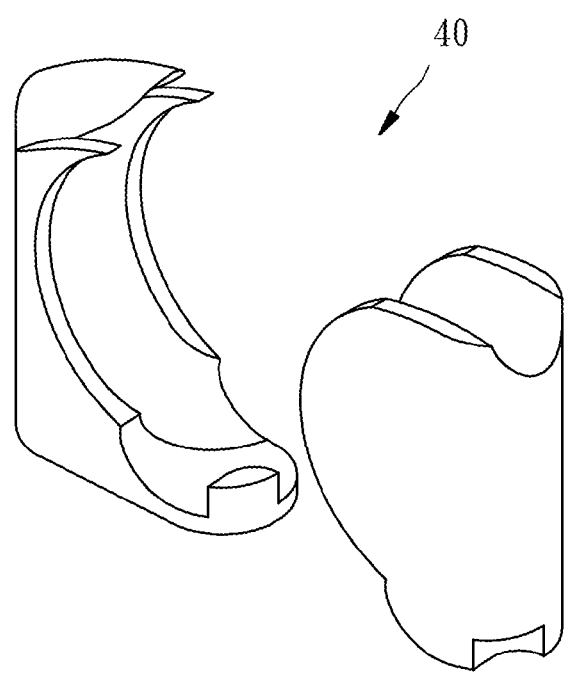
FIG. 5 is an exploded view of the returning member of the present invention.
Figure 6:
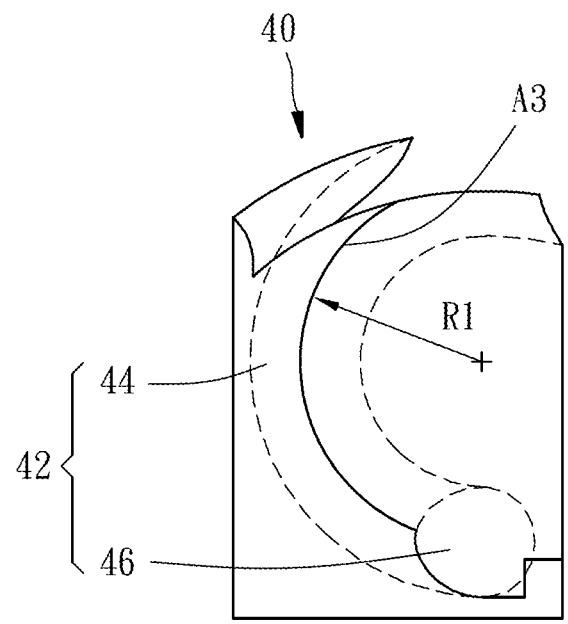
FIG. 6 is a schematic drawing of the first returning path of the returning member of the present invention, showing the first curvature radius.

Each of the returning members 40 is received in one said receiving recess 36 of the screw shaft 30 and has a redirecting channel 42, as shown in FIG. 5 and FIG. 6. The redirecting channel 42 is connected to the helix channel 12 and the returning channel 32, respectively. The redirecting channel 42 forms a first returning path 44 and a second returning path 46. The first returning path 44 has its one end connected to one end of the second returning path 46 so as to form a continuous channel that allows a plurality of balls 50 to pass therethrough. The first returning path 44 has its opposite end connected to the helix channel 12. The second returning path 46 has its opposite end connected to the returning channel 32.

The balls 50 are received in the helix channel 12, the redirecting channel 42, and the returning channel 32, so that the balls 50 can circulate along the closed path formed by the helix channel 12, the redirecting channel 42, and the returning channel 32 while the screw shaft 30 is rotating, thereby achieving return. For making the balls 50 move along the helix channel 12, the redirecting channel 42, and the returning channel 32 with the maximum smoothness, the first returning path 44 has one end tangentially connected to one end of the second returning path 46 and has an opposite end tangentially connected to the helix channel 12, while the second returning path 46 has its opposite end tangentially connected to the returning channel 32. In other words, the connection between the redirecting channel 42 and the helix channel 12, and the connection between the redirecting channel 42 and the returning channel 32 are both tangential connection. Therein, the first returning path is approximately greater than a semicircle, and the second returning path is approximately a quartered circle.

Figure 7:
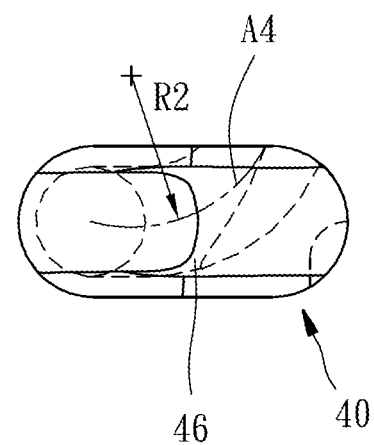
FIG. 7 is a schematic drawing of the second returning path of the returning member of the present invention, showing the second curvature radius.
Figure 8:
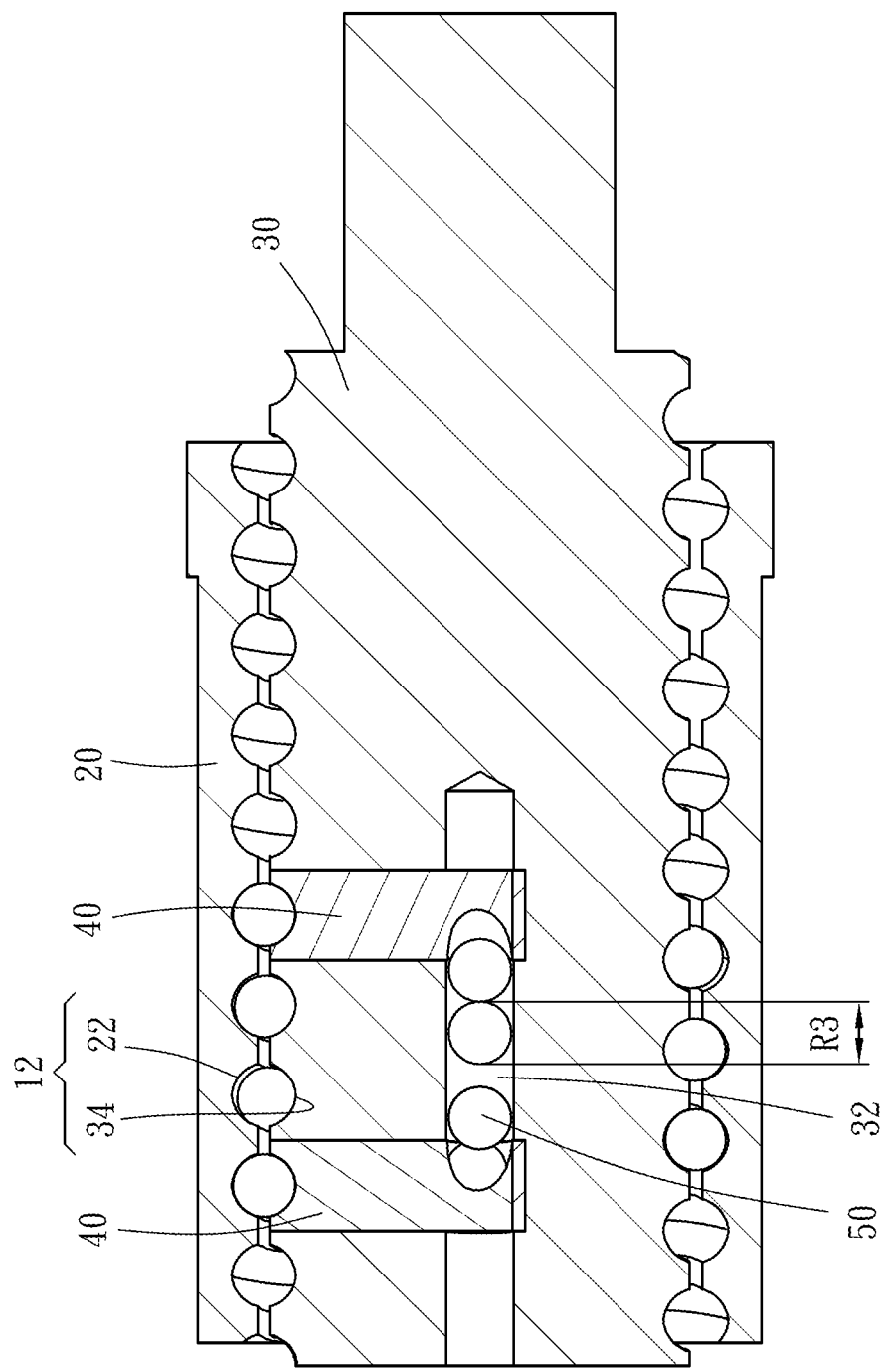
FIG. 8 is a longitudinal cross-sectional view of the first embodiment of the present invention.

It is to be noted that, as shown in FIG. 5 through FIG. 7, the first returning path 44 has an imaginary first path center line A3 that has a curvature radius referred to herein as the first curvature radius R1. The first curvature radius R1 is at least greater than a half of the ball diameter R3 of the balls 50, and is more preferably greater than the ball diameter R3 of the balls 50. Most preferably, the first curvature radius R1 is as large as 1.5 times of the ball diameter R3 of the balls 50. The second returning path 46 also has an imaginary second path center line A4. The second path center line A4 has a curvature radius referred to as the second curvature radius R2. Similarly, the second curvature radius R2 is at least greater than a half of the ball diameter R3 of the balls 50, and is more preferably greater than the ball diameter R3 of the balls 50. Most preferably, the second curvature radius R2 is as large as 1.5 times of the ball diameter R3 of the balls 50.

With the above configuration, the disclosed internal-circulation-type ball screw 10 uses the helix channel 12 formed between the nut 20 and the screw shaft 30, the returning channel 32 axially passing through the screw shaft 30, and the receiving recess 36 radially communicating the helix channel 12 and the returning channel 32, together with the returning member 40 installed in the receiving recesses 36 to accomplish return of the balls. As compared to the prior-art devices, the internal-circulation-type ball screw 10 of the present invention eliminates the need of using the interrupted-thread design, so as to help to minimize the outer diameter of the nut 20, while preventing the returning balls 50 from impacting other components, thereby improving the overall structure in terms of durability, reliability and cyclical stability.

What is claimed is:

1. An internal-circulation-type ball screw, comprising:
   a nut, having an internal-thread groove;
   a screw shaft, rotatably passing through the nut and having axially a returning channel, the screw shaft having and outer surface provided with an external-thread groove and two opposite receiving recesses, the external-thread groove corresponding the internal-thread groove of the nut so as to form a helix channel therebetween, each said receiving recess extending form the external-thread groove radially along the screw shaft so as to get communicated with the returning channel;
   two returning members, being received in the receiving recesses of the screw shaft and each having a redirecting channel, and the redirecting channel having one end connected to the helix channel and having an opposite end connected to the returning channel of the screw shaft; and
   a plurality of balls, being rollably received in the helix channel, the redirecting channel, and the returning channel;
   wherein the redirecting channel forms a first returning path and a second returning path the first returning path having one end connected to one end of the second returning path, the first returning path having an opposite end connected to the helix channel, and the second returning path having an opposite end connected to the returning channel;
   wherein the first returning path is greater than a semicircle defining a path of greater than 180°, and the second returning path is a quartered circle.

2. The internal-circulation-type ball screw of claim 1, wherein the redirecting channel and the helix channel are tangentially connected, and the redirecting channel and the returning channel are tangentially connected.

3. The internal-circulation-type ball screw of claim 1, wherein the first returning path and the second returning path are tangentially connected, and the first returning path and the helix channel are tangentially connected, while the second returning path and the returning channel are tangentially connected.

4. The internal-circulation-type ball screw of claim 1, wherein the first returning path has an imaginary first path center line, and the first path center line has a curvature radius that is a first curvature radius, which is greater than a ball diameter of each of the balls.

5. The internal-circulation-type ball screw of claim 1, wherein the second returning path has an imaginary second path center line, and the second path center line has a curvature radius that is a second curvature radius, which is greater than a ball diameter of each of the balls.

6. The internal-circulation-type ball screw of claim 5, wherein the curvature radius of the second returning path is as large as 1.5 times of the ball diameter of each of the balls.

* * * * *